US012371366B2

(12) United States Patent
Enomoto et al.

(10) Patent No.: US 12,371,366 B2
(45) Date of Patent: Jul. 29, 2025

(54) GLASS MATERIAL

(71) Applicant: NIPPON ELECTRIC GLASS CO., LTD., Otsu (JP)

(72) Inventors: Tomoko Enomoto, Otsu (JP); Naoki Fujita, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 305 days.

(21) Appl. No.: 17/920,855

(22) PCT Filed: May 11, 2021

(86) PCT No.: PCT/JP2021/017838
§ 371 (c)(1),
(2) Date: Jun. 6, 2023

(87) PCT Pub. No.: WO2021/230229
PCT Pub. Date: Nov. 18, 2021

(65) Prior Publication Data
US 2023/0286854 A1    Sep. 14, 2023

(30) Foreign Application Priority Data

May 15, 2020 (JP) .................................. 2020-085892

(51) Int. Cl.
*C03C 3/155* (2006.01)
*C03C 3/12* (2006.01)
*C03C 3/15* (2006.01)

(52) U.S. Cl.
CPC .............. *C03C 3/155* (2013.01); *C03C 3/127* (2013.01); *C03C 3/15* (2013.01); *C03C 3/125* (2013.01); *C03C 2218/13* (2013.01)

(58) Field of Classification Search
CPC ........... C03C 3/068; C03C 3/125; C03C 3/15; C03C 3/155; C03C 3/127
See application file for complete search history.

(56) References Cited

U.S. PATENT DOCUMENTS

| | | | |
|---|---|---|---|
| 6,482,758 B1 * | 11/2002 | Weber | C03C 4/0071 501/78 |
| 2002/0006857 A1 * | 1/2002 | Tachiwama | C03C 3/068 501/78 |
| 2005/0085371 A1 | 4/2005 | Tachiwama | |
| 2006/0079389 A1 | 4/2006 | Hayashi | |
| 2006/0189473 A1 | 8/2006 | Endo | |
| 2006/0205095 A1 | 9/2006 | Yono et al. | |
| 2007/0015651 A1 * | 1/2007 | Endo | C03B 11/08 65/129 |
| 2007/0262480 A1 | 11/2007 | Tachiwana | |
| 2013/0090225 A1 | 4/2013 | Matano et al. | |
| 2019/0062199 A1 * | 2/2019 | Kuang | C03C 3/155 |
| 2019/0185369 A1 * | 6/2019 | Inoue | C03B 40/04 |
| 2022/0169558 A1 * | 6/2022 | Fujita | C03C 3/068 |
| 2022/0185722 A1 * | 6/2022 | Fujita | C03C 3/15 |
| 2023/0086193 A1 | 3/2023 | Nakatsuka et al. | |
| 2023/0286855 A1 * | 9/2023 | Enomoto | C03C 4/02 |

FOREIGN PATENT DOCUMENTS

| | | |
|---|---|---|
| CN | 102050571 A | 5/2011 |
| CN | 102958858 A | 3/2013 |
| CN | 104098267 A | 10/2014 |
| CN | 105461222 A | 4/2016 |
| CN | 109775981 A | 5/2019 |
| JP | S5711846 A | 1/1982 |
| JP | H09278480 A | 10/1997 |
| JP | 2001348244 A | 12/2001 |
| JP | 2006-137662 A | 6/2006 |
| JP | 2006225220 A | 8/2006 |
| JP | 2007022846 A | 2/2007 |
| JP | 2007-230835 A | 9/2007 |
| JP | 2009286674 A | 12/2009 |
| JP | 2010-248057 A | 11/2010 |
| JP | 4789086 B2 | 10/2011 |
| JP | 2011246337 A * | 12/2011 |
| JP | 2013-519610 A | 5/2013 |
| JP | 2014221704 A | 11/2014 |
| JP | 2015-129058 A | 7/2015 |
| JP | 2015-151321 A | 8/2015 |
| JP | 2016-011228 A | 1/2016 |
| JP | 2016011248 A | 1/2016 |
| JP | 2018020935 A | 2/2018 |
| JP | 2019-511445 A | 4/2019 |
| JP | 2020-029378 A | 2/2020 |
| WO | 2011/098043 A1 | 8/2011 |
| WO | 2021171950 A1 | 9/2021 |

OTHER PUBLICATIONS

Official Communication issued in corresponding Chinese Patent Application No. 202180031687.3, mailed on Dec. 26, 2023.
Official Communication issued in corresponding Japanese Patent Application No. 2020-085892, mailed on Jun. 21, 2023, 6 pages.
Official Communication issued in corresponding Japanese Patent Application No. 2020-085892, mailed on Apr. 24, 2024, 4 pages.
Yamane et al., "Glass Engineering Handbook", Asakura Publishing Co., Ltd. Jul. 5, 1999, 4 pages.
Official Communication issued in International Patent Application No. PCT/JP2021/017838, mailed on Jul. 27, 2021.

* cited by examiner

Primary Examiner — Elizabeth A. Bolden
(74) Attorney, Agent, or Firm — Keating & Bennett, LLP

(57) ABSTRACT

A glass material less likely to cause inconveniences, such as crystallization and the generation of devitrified matters, while holding desired optical properties, has a refractive index of 1.8 or more and a content of $Al_2O_3$ of over 0 to 500 mass ppm.

5 Claims, 1 Drawing Sheet

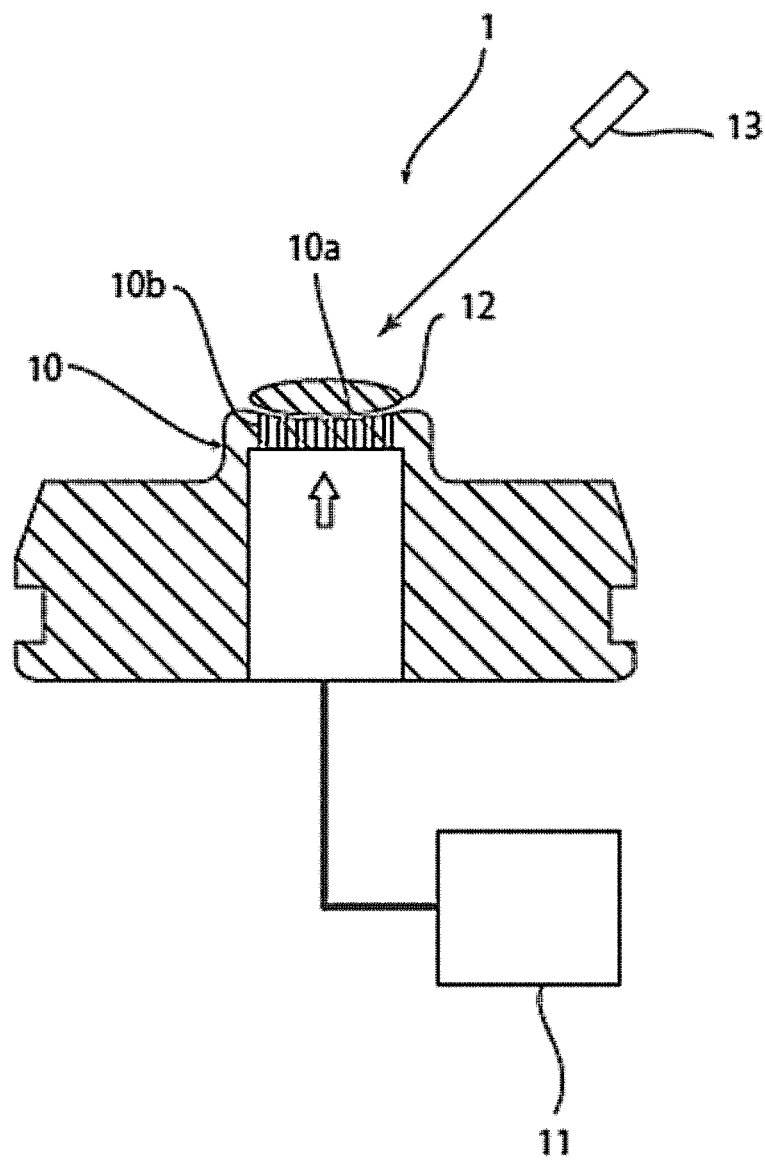

GLASS MATERIAL

TECHNICAL FIELD

The present invention relates to glass materials for use as optical elements in cameras, microscopes, endoscopes, and so on.

BACKGROUND ART

With recent size reduction and weight saving of optical systems for use in cameras, microscopes, endoscopes, and so on, optical elements, such as optical lenses, used in the optical systems are required to have optical properties of a high refractive index and a high dispersion. In order to make the refractive index of glass for use in an optical element higher, it is necessary to reduce the contents of $SiO_2$ and $B_2O_3$, which are principal scaffold components of the glass, in a glass composition and contain into the glass composition a large amount of rare-earth oxide, such as $La_2O_3$, $Gd_2O_3$ or $Ta_2O_5$, or intermediate oxide, such as $Nb_2O_5$ or $TiO_2$. However, when the amount of the scaffold components in the glass composition is reduced and a large amount of intermediate oxide is contained in the glass composition, this decreases the glass-formation ability and makes vitrification difficult. A general optical glass is produced by melting raw materials in a melting container, such as a crucible, and then cooling the melt therein. For a glass composition having a poor glass-formation ability, the conventional production method easily promotes crystallization from a contact interface with the melting container.

Even such a less vitrifiable composition can be vitrified by eliminating the contact with the melting container and increasing the cooling speed from a melting state. There is known, as such a method, the containerless levitation technique (containerless solidification technique) in which raw materials are melted and cooled as they are levitated. With the use of this technique, molten glass is substantially out of contact with the melting container and can be rapidly cooled, which enables vitrification of even a less vitrifiable composition as described above. For example, in Patent Literature 1, a glass containing $TiO_2$ and BaO only as a glass composition is produced by the containerless levitation technique.

CITATION LIST

Patent Literature

[PTL 1]
JP-B2-4789086

SUMMARY OF INVENTION

Technical Problem

Even with the use of the containerless levitation technique, there may be a case where crystallization occurs in the production process, resulting in failure to obtain a glass material and a case where an obtained glass contains devitrified matters. These tendencies are significant particularly for less vitrifiable compositions.

In order to avoid crystallization and the generation of devitrified matters, it is useful to add a network-forming oxide to a glass composition. However, network-forming oxides generally have the effect of decreasing the refractive index, which may make it impossible to obtain desired optical properties.

In view of the foregoing, the present invention has an object of providing a glass material less likely to cause inconveniences, such as crystallization and the generation of devitrified matters, while holding desired optical properties.

Solution to Problem

A glass material according to the present invention has a refractive index of 1.8 or more and a content of $Al_2O_3$ of over 0 to 500 mass ppm (hereinafter "ppm").

Since, as just described, the glass material contains $Al_2O_3$ in an amount as extremely small as over 0 to 500 ppm as an essential component, it is possible to reduce crystallization and the generation of devitrified matters without decreasing the refractive index.

The glass material according to the present invention contains, in terms of % by mole, over 0 to 70% $La_2O_3$ and over 0 to less than 100% $Gd_2O_3+Y_2O_3+Yb_2O_3+Lu_2O_3+ZrO_2+TiO_2+Nb_2O_5+Ta_2O_5+WO_3+Ga_2O_3+GeO_2+B_2O_3+SiO_2+P_2O_5$. In the present invention, "(component)+(component)+ . . . " means the total content of the components. In this relation, the glass material need not necessarily contain each of these components as an essential component and one or some of the components may not be contained therein (the content of the one or some of the components may be 0%).

With the above composition, a glass material having a refractive index of 1.8 or more can be easily obtained.

The glass material according to the present invention is preferably used as an optical element.

The glass material according to the present invention is preferably used as an ornament.

A method for producing a glass material according to the present invention is a method for producing any one of the above-described glass materials and includes heating a raw material block to melting with the raw material block held levitated above a forming surface of a forming die by jetting gas through a gas jet hole opening on the forming surface, thus obtaining a molten glass and then cooling the molten glass.

Advantageous Effects of Invention

The present invention enables provision of a glass material less likely to cause inconveniences, such as crystallization and the generation of devitrified matters, while holding desired optical properties.

BRIEF DESCRIPTION OF DRAWINGS

FIG. 1 is a schematic cross-sectional view showing an embodiment of an apparatus for producing a glass material according to the present invention.

DESCRIPTION OF EMBODIMENTS

The refractive index (nd) of a glass material according to the present invention is 1.8 or more, preferably 1.9 or more, and particularly preferably 2.0 or more. Thus, the glass material becomes suitable in applications, such as an optical element and an ornament.

The glass material according to the present invention contains $Al_2O_3$ as an essential component. $Al_2O_3$ is a component that reduces crystallization during cooling of molten glass and reduces the generation of devitrified matters in glass. The content of $Al_2O_3$ is over 0 to 500 ppm, preferably 0.5 to 400 ppm, more preferably 1 to 300 ppm, and particularly preferably 3 to 250 ppm. If the content of $Al_2O_3$ is too small, the above effect is difficult to achieve. On the other hand, if the content of $Al_2O_3$ is too large, the refractive index decreases and desired optical properties are difficult to obtain.

The glass article according to the present invention preferably contains, in terms of % by mole, over 0 to 70% $La_2O_3$ and over 0 to less than 100% $Gd_2O_3+Y_2O_3+Yb_2O_3+Lu_2O_3+ZrO_2+TiO_2+Nb_2O_5+Ta_2O_5+WO_3+Ga_2O_3+GeO_2+B_2O_3+SiO_2+P_2O_5$. The reasons why the glass composition is limited as just described will be described below. In the following description of the contents of components, "%" refers to "% by mole" unless otherwise stated.

$La_2O_3$ is a component that forms a glass scaffold and a component that increases the refractive index without decreasing the light transmittance. $La_2O_3$ also has the effect of increasing the weather resistance. The content of $La_2O_3$ is over 0 to 70%, preferably 5 to 68%, and particularly preferably 10 to 63%. If the content of $La_2O_3$ is too small, the above effects are difficult to achieve. On the other hand, if the content of $La_2O_3$ is too large, the glass material is difficult to vitrify.

$Gd_2O_3$, $Y_2O_3$, $Yb_2O_3$, $Lu_2O_3$, $ZrO_2$, $TiO_2$, $Nb_2O_5$, $Ta_2O_5$, $WO_3$, $Ga_2O_3$, $GeO_2$, $B_2O_3$, $SiO_2$, and $P_2O_5$ are components that increase the refractive index and widen the vitrification range. The content of $Gd_2O_3+Y_2O_3+Yb_2O_3+Lu_2O_3+ZrO_2+TiO_2+Nb_2O_5+Ta_2O_5+WO_3+Ga_2O_3+GeO_2+B_2O_3+SiO_2+P_2O_5$ is over 0%, preferably 5% or more, more preferably 10% or more, still more preferably 20% or more, and particularly preferably 30% or more. If the content of $Gd_2O_3+Y_2O_3+Yb_2O_3+Lu_2O_3+ZrO_2+TiO_2+Nb_2O_5+Ta_2O_5+WO_3+Ga_2O_3+GeO_2+B_2O_3+SiO_2+P_2O_5$ is too small, the above effects are difficult to achieve. On the other hand, the upper limit of the content of $Gd_2O_3+Y_2O_3+Yb_2O_3+Lu_2O_3+ZrO_2+TiO_2+Nb_2O_5+Ta_2O_5+WO_3+Ga_2O_3+GeO_2+B_2O_3+SiO_2+P_2O_5$ is less than 100%, preferably not more than 99%, particularly preferably not more than 95% in consideration of the contents of the other components. The total content of two or more of the above components is also preferably in the above range.

Each component of $Gd_2O_3$, $Y_2O_3$, $Yb_2O_3$, $Lu_2O_3$, $ZrO_2$, $TiO_2$, $Nb_2O_5$, $Ta_2O_5$, $WO_3$, $Ga_2O_3$, $GeO_2$, $B_2O_3$, $SiO_2$, and $P_2O_5$ will be described below in detail.

$Gd_2O_3$ is a component that increases the refractive index. $Gd_2O_3$ also has the effect of increasing the weather resistance. However, if the content of $Gd_2O_3$ is too large, the glass material is difficult to vitrify. Therefore, the content of $Gd_2O_3$ is preferably 0 to 40%, more preferably 1 to 35%, and particularly preferably 3 to 30%.

$Y_2O_3$ is a component that increases the refractive index. $Y_2O_3$ also has the effect of increasing the weather resistance. However, if the content of $Y_2O_3$ is too large, the glass material is difficult to vitrify. Therefore, the content of $Y_2O_3$ is preferably 0 to 30%, more preferably 1 to 25%, and particularly preferably 5 to 20%.

$Yb_2O_3$ is a component that increases the refractive index. However, if the content of $Yb_2O_3$ is too large, the glass material is difficult to vitrify. In addition, the raw material cost tends to be high. Therefore, the content of $Y_2O_3$ is preferably 0 to 30%, more preferably 1 to 25%, and particularly preferably 5 to 20%.

$Lu_2O_3$ is a component that increases the refractive index. However, if the content of $Lu_2O_3$ is too large, the glass material is difficult to vitrify and the raw material cost tends to be high. Therefore, the content of $Lu_2O_3$ is preferably 0 to 20%, more preferably 1 to 15%, and particularly preferably 5 to 10%.

$ZrO_2$ is a component that increases the refractive index. In addition, because $ZrO_2$ forms a glass scaffold as an intermediate oxide, it also has the effect of widening the vitrification range. However, if the content of $ZrO_2$ is too large, the glass material is difficult to vitrify and the melting temperature becomes excessively high. Therefore, the content of $ZrO_2$ is preferably 0 to 40%, more preferably 1 to 30%, still more preferably 3 to 25%, and particularly preferably 5 to 20%.

$TiO_2$ is a component having a significant effect of increasing the refractive index and also has the effect of increasing the chemical durability. In addition, $TiO_2$ also has the effect of widening the vitrification range. The content of $TiO_2$ is preferably 0 to 90%, more preferably 5 to 85%, and particularly preferably 10 to 80%. If the content of $TiO_2$ is too large, the wavelength absorption edge of the glass shifts toward a longer wavelength, which makes it likely that the transmittance of visible light (particularly, visible light in the short wavelength range) decreases. In addition, the glass material is difficult to vitrify.

$Nb_2O_5$ is a component having a significant effect of increasing the refractive index and also has the effect of widening the vitrification range. The content of $Nb_2O_5$ is preferably 0 to 80%, more preferably 1 to 75%, still more preferably 5 to 70%, and particularly preferably 10 to 65%. If the content of $Nb_2O_5$ is too small, the above effects are difficult to achieve. On the other hand, if the content of $Nb_2O_5$ is too large, the glass material is difficult to vitrify.

$Ta_2O_5$ is a component having a significant effect of increasing the refractive index. However, if the content of $Ta_2O_5$ is too large, the glass material is difficult to vitrify and the raw material cost tends to be high. Therefore, the content of $Ta_2O_5$ is preferably 0 to 60%, more preferably 0.1 to 50%, still more preferably 3 to 45%, and particularly preferably 5 to 40%.

$WO_3$ is a component that increases the refractive index. However, if the content of $WO_3$ is too large, the glass material is difficult to vitrify. Therefore, the content of $WO_3$ is preferably 0 to 30%, more preferably 1 to 25%, and particularly preferably 5 to 20%.

$Ga_2O_3$ forms a glass scaffold as an intermediate oxide and is therefore a component that widens the vitrification range. In addition, $Ga_2O_3$ also has the effect of increasing the refractive index. However, if the content of $Ga_2O_3$ is too large, the glass material is difficult to vitrify and the raw material cost tends to be high. Therefore, the content of $Ga_2O_3$ is preferably 0 to 60%, more preferably 0 to 50%, still more preferably 0 to 40%, and particularly preferably 0 to 30%.

$GeO_2$ is a component that increases the refractive index and also has the effect of widening the vitrification range. However, if the content of $GeO_2$ is too large, the raw material cost tends to be high. Therefore, the content of $GeO_2$ is preferably 0 to 10% and more preferably 0 to 5%.

$B_2O_3$ is a component that forms a glass scaffold and widens the vitrification range. In addition, $B_2O_3$ lowers the glass transition point to facilitate press forming. However, if the content of $B_2O_3$ is too large, the refractive index decreases and desired optical properties are difficult to obtain. Therefore, the content of $B_2O_3$ is preferably 0 to 50%, more preferably 0.1 to 40%, still more preferably 3 to 38%, and particularly preferably 5 to 37%.

$SiO_2$ is a component that forms a glass scaffold and widens the vitrification range. However, if the content of $SiO_2$ is too large, the refractive index decreases and desired optical properties are difficult to obtain. Therefore, the content of $SiO_2$ is preferably 0 to 40%, more preferably 0 to 30%, and particularly preferably 0.1 to 20%.

$P_2O_5$ is a component that constitutes part of a glass scaffold and has the effect of widening the vitrification range. However, if its content is too large, the glass is likely to cause phase separation. Therefore, the content of $P_2O_5$ is preferably 0 to 10% and more preferably 0 to 5%.

In order to obtain an optical property of a high refractive index, it is preferred to adjust the content of $Gd_2O_3+Y_2O_3+Yb_2O_3+Lu_2O_3+ZrO_2+TiO_2+Nb_2O_5+Ta_2O_5+WO_3+Ga_2O_3+GeO_2$. The content of $Gd_2O_3+Y_2O_3+Yb_2O_3+Lu_2O_3+ZrO_2+TiO_2+Nb_2O_5+Ta_2O_5+WO_3+Ga_2O_3+GeO_2$ is preferably 0% or more, more preferably over 0%, still more preferably 5% or more, yet still more preferably 10% or more, even still more preferably 20% or more, and particularly preferably 30% or more. However, if the content of $Gd_2O_3+Y_2O_3+Yb_2O_3+Lu_2O_3+ZrO_2+TiO_2+Nb_2O_5+Ta_2O_5+WO_3+Ga_2O_3+GeO_2$ is too large, the glass material is difficult to vitrify. Therefore, its content is preferably less than 100%, more preferably 99% or less, and particularly preferably 95%.

Furthermore, in order to facilitate vitrifying the glass material, the content of $B_2O_3+SiO_2+P_2O_5$ is preferably adjusted. The content of $B_2O_3+SiO_2+P_2O_5$ is preferably 0% or more, more preferably over 0%, still more preferably 0.1% or more, yet still more preferably 3% or more, and particularly preferably 5% or more. However, if the content of $B_2O_3+SiO_2+P_2O_5$ is too large, the refractive index decreases and desired optical properties are difficult to obtain. Therefore, its content is preferably 80% or less, more preferably 75% or less, and particularly preferably 70% or less.

When the glass article according to the present invention positively contains components capable of widening the vitrification range, such as $La_2O_3$, $Nb_2O_5$, $TiO_2$, and $B_2O_3$, this facilitates reduction in undue crystallization during glass production and increase in size of the glass article (for example, to a diameter of 2 mm or more, 3 mm or more, 4 mm or more, or particularly 5 mm or more).

The glass article according to the present invention may contain, aside from the above components, the following components.

MgO, CaO, SrO, BaO, and ZnO are components that widen the vitrification range. The glass material can contain each of these components in a range of 10% or less. If the content of these components is too large, the refractive index decreases and desired optical properties are difficult to obtain.

By containing into the glass material a coloring component made of an oxide of V, Cr, Mn, Fe, Co, Ni, Cu, Mo, Ru, Ce, Pr or Er, the glass article can be controlled to a desired color, which is suitable for ornament application. These coloring components may be contained singly or in a combination of two or more of them in the glass material. The content of the oxide (or, when the glass material contains two or more of the above oxides, the total content thereof) is preferably 0 to 20%, more preferably 0.001 to 10%, still more preferably 0.005 to 5%, and particularly preferably 0.01 to 1%. However, depending on the component contained, the glass material may be excessively colored and is therefore likely to decrease the visible range transmittance. As a result, the glass material may not obtain a desired brightness or fire and may be difficult to use as an ornament. In this case, the content of the above oxide may be less than 1%, 0.5% or less, or 0.1% or less.

Specific examples of the composition of the glass article include a $La_2O_3$—$Nb_2O_5$-based composition, a $La_2O_3$—$TiO_2$-based composition, a $La_2O_3$—$Ta_2O_5$-based composition, and a $La_2O_3$—$B_2O_3$-based composition.

Examples of the $La_2O_3$—$Nb_2O_5$-based composition include those containing, in terms of % by mole, 5 to 80% (preferably 10 to 70%) $La_2O_3$, 1 to 80% (preferably 20 to 70%) $Nb_2O_5$, 0 to 80% (preferably 0 to 75%) $TiO_2$, 0 to 45% (preferably 0 to 40%) $Ta_2O_5$, 0 to 20% (preferably 0 to 15%) $Gd_2O_3$, 0 to 25% (preferably 0 to 20%) $ZrO_2$, 0 to 30% (preferably 0 to 20%) $WO_3$, 0 to 50% (preferably 0 to 40%) $B_2O_3$, 0 to 40% (preferably 0 to 35%) $SiO_2$, 0 to 70% (preferably 0 to 60%) $Ga_2O_3$, and 0 to 10% ZnO.

Examples of the $La_2O_3$—$TiO_2$-based composition include those containing, in terms of % by mole, 5 to 40% (preferably 10 to 35%) $La_2O_3$, 40 to 85% (preferably 50 to 80%) $TiO_2$, 0 to 55% (preferably 0 to 50%) $Ta_2O_5$, 0 to 20% (preferably 1 to 15%) $Gd_2O_3$, 0 to 25% (preferably 5 to 20%) $ZrO_2$, 0 to 30% (preferably 0 to 20%) $WO_3$, 0 to 50% (preferably 0 to 40%) $B_2O_3$, 0 to 40% (preferably 0 to 35%) $SiO_2$, 0 to 70% (preferably 0 to 60%) $Ga_2O_3$, and 0 to 10% ZnO.

Examples of the $La_2O_3$—$Ta_2O_5$-based composition include those containing, in terms of % by mole, 10 to 80% (preferably 20 to 70%) $La_2O_3$, 5 to 70% (preferably 10 to 60%) $Ta_2O_5$, 0 to 20% (preferably 0 to 15%) $Gd_2O_3$, 0 to 25% (preferably 0 to 20%) $ZrO_2$, 0 to 30% (preferably 0 to 20%) $WO_3$, 0 to 50% (preferably 0 to 40%) $B_2O_3$, 0 to 40% (preferably 0 to 35%) $SiO_2$, 0 to 70% (preferably 0 to 60%) $Ga_2O_3$, and 0 to 10% ZnO.

Examples of the $La_2O_3$—$B_2O_3$-based composition include those containing, in terms of % by mole, 20 to 75% (preferably 30 to 70%) $La_2O_3$, 5 to 70% (preferably 10 to 60%) $B_2O_3$, 0 to 20% (preferably 0 to 15%) $Gd_2O_3$, 0 to 25% (preferably 0 to 20%) $ZrO_2$, 0 to 30% (preferably 0 to 20%) $WO_3$, 0 to 40% (preferably 0 to 35%) $SiO_2$, 0 to 50% (preferably 0 to 40%) $Ga_2O_3$, and 0 to 10% ZnO.

Examples of the $La_2O_3$—$Ga_2O_3$-based composition include those containing, in terms of % by mole, 10 to 60% (preferably 20 to 55%) $La_2O_3$, 5 to 75% (preferably 10 to 60%) $Ga_2O_3$, 0 to 20% (preferably 0 to 15%) $Gd_2O_3$, 0 to 25% (preferably 0 to 20%) $ZrO_2$, 0 to 30% (preferably 0 to 20%) $WO_3$, 0 to 40% (preferably 0 to 35%) $SiO_2$, and 0 to 10% ZnO.

The glass material according to the present invention can be used for applications including optical elements, such as a lens and a prism, and ornaments for jewelry goods, artworks, and dishes.

FIG. 1 is an example of a schematic cross-sectional view of a production apparatus for producing a glass material according to the present invention. A production apparatus 1 for a glass material includes a forming die 10. The forming die 10 serves also as a melting container. The forming die 10 includes a forming surface 10a and a gas jet hole 10b opening on the forming surface 10a. The gas jet hole 10b comprises a plurality of holes. Thus, a raw material block 12, a molten glass, and a glass material can be stably levitated. Alternatively, a forming die with a single gas jet hole 10b may be used. The gas jet holes 10b are connected to a gas supply mechanism 11, such as a compressed gas cylinder. Gas is supplied from this gas supply mechanism 11 via the gas jet holes 10b to the forming surface 10a. The type of the gas is not particularly limited and may be, for example, air or oxygen or may be nitrogen gas, argon gas, helium gas, carbon monoxide gas, carbon dioxide oxide or hydrogen-containing reducing gas.

In producing a glass material using the production apparatus 1, first, a raw material block 12 is placed on the forming surface 10a. Examples of the raw material block 12 include a body obtained by forming glass raw material powders into a single piece by press forming or other processes, a sintered body obtained by forming glass raw material powders into a single piece by press forming or other processes and then sintering the single piece, and an aggregate of crystals having the same composition as a desired glass composition. Alternatively, a body obtained by cutting or crushing the above sintered body may be used as a raw material block. Next, gas is jetted out through the gas jet holes 10b, thus levitating the raw material block 12 above the forming surface 10a. In other words, the raw material block 12 is held out of contact with the forming surface 10a. In this state, the raw material block 12 is irradiated with laser light from a laser light applicator 13. Thus, the raw material block 12 is heated to melting, thereby obtaining a molten glass. Thereafter, the molten glass is cooled and, thus, a glass material can be obtained. During the melting step and the cooling step, at least the jetting of gas is preferably continued to restrain the contact of the raw material block 12, the molten glass, and the glass material with the forming surface 10a. The method for heating the raw material block may be radiation heating besides the method of irradiating it with laser light.

Examples of the material for the forming die include aluminum, aluminum-magnesium alloy, aluminum-silicon alloy, aluminum-magnesium-silicon alloy, aluminum-magnesium-zinc alloy, metallic silicon, stainless steel, duralumin, platinum, platinum-rhodium alloy, tungsten, tungsten alloy, zirconium, titanium, and titanium alloy. Among them, aluminum, aluminum-magnesium alloy, aluminum-silicon alloy, aluminum-magnesium-silicon alloy, aluminum-magnesium-zinc alloy are preferred in terms of corrosion resistance and workability.

Examples

Hereinafter, the present invention will be described with reference to examples, but the present invention is not limited to the following examples.

Tables 1 to 4 show Examples (Nos. 2 to 4, 7, 8, 11 to 13, 16, 17, 20 to 22, 25, 26, 29 to 31, 34, and 35) of the present invention and Comparative Examples (Nos. 1, 5, 6, 9, 10, 14, 15, 18, 19, 23, 24, 27, 28, 32, 33, and 36).

TABLE 1

| | | | 1 | 2 | 3 | 4 | 5 | 6 | 7 | 8 | 9 |
|---|---|---|---|---|---|---|---|---|---|---|---|
| Glass Composition | $La_2O_3$ | % by mole | 30 | 30 | 30 | 29.99 | 29.97 | 10 | 10 | 10 | 9.99 |
| | $Nb_2O_5$ | | 60 | 60 | 60 | 59.98 | 59.94 | | | | |
| | $Gd_2O_3$ | | | | | | | 5 | 5 | 5 | 5 |
| | $Ta_2O_5$ | | | | | | | | | | |
| | $ZrO_2$ | | | | | | | 10 | 10 | 10 | 9.99 |
| | $TiO_2$ | | | | | | | 75 | 75 | 74.99 | 74.94 |
| | $SiO_2$ | | | | | | | | | | |
| | $B_2O_3$ | | 10 | 10 | 10 | 10 | 9.99 | | | | |
| | $Ga_2O_3$ | | | | | | | | | | |
| | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2 + B_2O_3 + SiO_2 + P_2O_5$ | | 70 | 70 | 70 | 69.98 | 69.93 | 90 | 90 | 89.99 | 89.93 |
| | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2$ | | 60 | 60 | 60 | 59.98 | 59.94 | 90 | 90 | 89.99 | 89.93 |
| | $B_2O_3 + SiO_2 + P_2O_5$ | | 10 | 10 | 10 | 10 | 9.99 | 0 | 0 | 0 | 0 |
| | $Al_2O_3$ | ppm | 0 | 10 | 80 | 250 | 1000 | 0 | 30 | 120 | 800 |
| | Resistance to Devitrification | | x | Δ | ○ | ○ | ○ | x | ○ | ○ | ○ |
| | Refractive Index | | 2.224 | 2.224 | 2.224 | 2.224 | 2.223 | 2.321 | 2.321 | 2.321 | 2.32 |

TABLE 2

| | | | 10 | 11 | 12 | 13 | 14 | 15 | 16 | 17 | 18 |
|---|---|---|---|---|---|---|---|---|---|---|---|
| Glass Composition | $La_2O_3$ | % by mole | 63 | 63 | 63 | 62.97 | 62.94 | 20 | 20 | 20 | 19.99 |
| | $Nb_2O_5$ | | | | | | | 40 | 40 | 40 | 39.97 |
| | $Gd_2O_3$ | | | | | | | | | | |
| | $Ta_2O_5$ | | | | | | | | | | |
| | $ZrO_2$ | | | | | | | 40 | 40 | 39.99 | 39.97 |
| | $TiO_2$ | | | | | | | | | | |
| | $SiO_2$ | | | 10 | 10 | 10 | 10 | 9.99 | | | |
| | $B_2O_3$ | | | 27 | 27 | 27 | 26.99 | 26.97 | | | |
| | $Ga_2O_3$ | | | | | | | | | | |
| | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2 + B_2O_3 + SiO_2 + P_2O_5$ | | 37 | 37 | 37 | 36.99 | 36.96 | 80 | 80 | 79.99 | 79.94 |
| | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2$ | | 0 | 0 | 0 | 0 | 0 | 80 | 80 | 79.99 | 79.94 |

TABLE 2-continued

|  |  |  | 10 | 11 | 12 | 13 | 14 | 15 | 16 | 17 | 18 |
|---|---|---|---|---|---|---|---|---|---|---|---|
|  | $B_2O_3 + SiO_2 + P_2O_5$ |  | 37 | 37 | 37 | 36.99 | 36.96 | 0 | 0 | 0 | 0 |
|  | $Al_2O_3$ | ppm | 0 | 25 | 50 | 300 | 1000 | 0 | 5 | 100 | 750 |
|  | Resistance to Devitrification |  | x | ○ | ○ | ○ | ○ | x | Δ | ○ | ○ |
|  | Refractive Index |  | 1.915 | 1.915 | 1.915 | 1.915 | 1.914 | 2.299 | 2.299 | 2.299 | 2.298 |

TABLE 3

|  |  |  | 19 | 20 | 21 | 22 | 23 | 24 | 25 | 26 | 27 |
|---|---|---|---|---|---|---|---|---|---|---|---|
| Glass Composition | $La_2O_3$ | % by mole | 50 | 50 | 50 | 49.99 | 49.95 | 30 | 30 | 30 | 29.98 |
|  | $Nb_2O_5$ |  | 20 | 20 | 20 | 20 | 19.98 |  |  |  |  |
|  | $Gd_2O_3$ |  |  |  |  |  |  |  |  |  |  |
|  | $Ta_2O_5$ |  |  |  |  |  |  | 40 | 40 | 40 | 39.98 |
|  | $ZrO_2$ |  |  |  |  |  |  |  |  |  |  |
|  | $TiO_2$ |  |  |  |  |  |  |  |  |  |  |
|  | $SiO_2$ |  |  |  |  |  |  |  |  |  |  |
|  | $B_2O_3$ |  |  |  |  |  |  |  |  |  |  |
|  | $Ga_2O_3$ |  | 30 | 30 | 30 | 29.99 | 29.97 | 30 | 30 | 30 | 29.98 |
|  | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2 + B_2O_3 + SiO_2 + P_2O_5$ |  | 50 | 50 | 50 | 49.99 | 49.95 | 70 | 70 | 70 | 69.96 |
|  | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2$ |  | 50 | 50 | 50 | 49.99 | 49.95 | 70 | 70 | 70 | 69.96 |
|  | $B_2O_3 + SiO_2 + P_2O_5$ |  | 0 | 0 | 0 | 0 | 0 | 0 | 0 | 0 | 0 |
|  | $Al_2O_3$ | ppm | 0 | 20 | 80 | 200 | 1000 | 0 | 3 | 15 | 600 |
|  | Resistance to Devitrification |  | x | ○ | ○ | ○ | ○ | x | Δ | ○ | ○ |
|  | Refractive Index |  | 2.065 | 2.065 | 2.065 | 2.065 | 2.064 | 2.106 | 2.106 | 2.106 | 2.105 |

TABLE 4

|  |  |  | 28 | 29 | 30 | 31 | 32 | 33 | 34 | 35 | 36 |
|---|---|---|---|---|---|---|---|---|---|---|---|
| Glass Composition | $La_2O_3$ | % by mole | 20 | 20 | 20 | 19.99 | 19.98 | 20 | 20 | 20 | 19.99 |
|  | $Nb_2O_5$ |  | 50 | 50 | 49.99 | 49.97 | 49.95 | 30 | 30 | 29.99 | 29.98 |
|  | $Gd_2O_3$ |  |  |  |  |  |  |  |  |  |  |
|  | $Ta_2O_5$ |  |  |  |  |  |  |  |  |  |  |
|  | $ZrO_2$ |  |  |  |  |  |  |  |  |  |  |
|  | $TiO_2$ |  |  |  |  |  |  | 20 | 20 | 20 | 19.99 |
|  | $SiO_2$ |  |  |  |  |  |  |  |  |  |  |
|  | $B_2O_3$ |  | 30 | 30 | 30 | 29.99 | 29.97 | 30 | 30 | 30 | 29.98 |
|  | $Ga_2O_3$ |  |  |  |  |  |  |  |  |  |  |
|  | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2 + B_2O_3 + SiO_2 + P_2O_5$ |  | 80 | 80 | 79.99 | 79.96 | 79.92 | 80 | 80 | 79.99 | 79.95 |
|  | $Gd_2O_3 + Y_2O_3 + Yb_2O_3 + Lu_2O_3 + ZrO_2 + TiO_2 + Nb_2O_5 + Ta_2O_5 + WO_3 + Ga_2O_3 + GeO_2$ |  | 50 | 50 | 49.99 | 49.97 | 49.95 | 50 | 50 | 49.99 | 49.97 |
|  | $B_2O_3 + SiO_2 + P_2O_5$ |  | 30 | 30 | 30 | 29.99 | 29.97 | 30 | 30 | 30 | 29.98 |
|  | $Al_2O_3$ | ppm | 0 | 50 | 100 | 500 | 1000 | 0 | 5 | 100 | 600 |
|  | Resistance to Devitrification |  | x | Δ | ○ | ○ | ○ | x | ○ | ○ | ○ |
|  | Refractive Index |  | 2.044 | 2.044 | 2.044 | 2.044 | 2.043 | 2.121 | 2.121 | 2.121 | 2.12 |

An amount of 0.3 to 0.6 g of raw material powders formulated to have each of glass compositions indicated in Tables 1 to 4 were press-formed and then sintered at 900 to 1100° C. for 3 to 12 hours, thus producing a raw material block.

Using the raw material block obtained in the above manner, a substantially spherical glass material with a diameter of approximately 5 to 7 mm was produced by the containerless levitation technique using an apparatus conforming to FIG. 1. A single to four 100W $CO_2$ laser oscillators were used as a heat source. The flow rate of gas supplied was in a range 1 to 15 L/min. Twenty samples for each glass composition were produced and evaluated in terms of probability of devitrified matters and refractive index (nd) in the following manners.

The presence or absence of devitrified matters inside the glass material was confirmed by observing the glass material with a stereomicroscope (SMZ 1000 manufactured by Nikon Corporation) of ten times power. When the probability of devitrified matters (the percentage of defective samples in all of the twenty samples) was 0 to 10%, over 10 to 20%, and over 20%, the glass material was evaluated as "o", "Δ", and "x", respectively.

In evaluating the refractive index, the glass material was bonded onto a 5 mm thick base material made of soda-lime glass plate and then polished at a right angle. The obtained glass material was evaluated by a value measured for the d-line (587.6 nm) of a helium lamp with a device KPR-2000 manufactured by Shimadzu Corporation.

As is obvious from Tables 1 to 4, the glass materials in Examples contained $Al_2O_3$ in a range of over 0 to 500 ppm and exhibited excellent resistance to devitrification. On the other hand, the $Al_2O_3$-free glass materials of Nos. 1, 6, 10, 15, 19, 24, 28, and 33 exhibited poor resistance to devitrified matters. The glass materials of Nos. 5, 9, 14, 18, 23, 27, 32, and 36 containing over 500 ppm of $Al_2O_3$ exhibited slightly lower refractive indices and could not obtain desired optical properties.

The invention claimed is:

1. A glass material having a refractive index of 1.8 or more, a content of $Al_2O_3$ of over 0 to 500 mass ppm, and containing, in terms of % by mole, 19.99 to 70% $La_2O_3$ and 5 to 70% $Nb_2O_5$.

2. The glass material according to claim 1, containing, in terms of % by mole, 5 to less than 80.01% $Gd_2O_3+Y_2O_3+Yb_2O_3$—$Lu_2O_3+ZrO_2+TiO_2+Nb_2O_5+Ta_2O_5+WO_3+Ga_2O_3+GeO_2+B_2O_3+SiO_2+P_2O_5$.

3. An optical element comprising:
the glass material according to claim 1.

4. An ornament comprising:
the glass material according to claim 1.

5. A method for producing the glass material according to claim 1, the method comprising heating a raw material block to melting with the raw material block held levitated above a forming surface of a forming die by jetting gas through a gas jet hole opening on the forming surface, thus obtaining a molten glass and then cooling the molten glass.

* * * * *